United States Patent
Galvin (10) Patent No.: US 11,117,137 B2
(45) Date of Patent: Sep. 14, 2021

(54) FEED APPARATUS FOR A PARTICLE SEPARATOR, PARTICLE SEPARATOR AND METHOD OF PARTICLE SEPARATION

(71) Applicant: NEWCASTLE INNOVATION LIMITED, Callaghan (AU)

(72) Inventor: Kevin Patrick Galvin, Callaghan (AU)

(73) Assignee: NEWCASTLE INNOVATION LIMITED, Callaghan (AU)

(*) Notice: Subject to any disclaimer, the term of this patent is extended or adjusted under 35 U.S.C. 154(b) by 0 days.

(21) Appl. No.: 16/096,447

(22) PCT Filed: Apr. 26, 2017

(86) PCT No.: PCT/AU2017/050377
§ 371 (c)(1),
(2) Date: Oct. 25, 2018

(87) PCT Pub. No.: WO2017/185131
PCT Pub. Date: Nov. 2, 2017

(65) Prior Publication Data
US 2019/0126287 A1   May 2, 2019

(30) Foreign Application Priority Data
Apr. 26, 2016   (AU) ................. 2016901539

(51) Int. Cl.
| B03B 11/00 | (2006.01) |
| B03B 5/62 | (2006.01) |
| B01D 21/00 | (2006.01) |

(52) U.S. Cl.
CPC ............. B03B 11/00 (2013.01); B03B 5/623 (2013.01); B01D 21/0039 (2013.01); B01D 21/0042 (2013.01)

(58) Field of Classification Search
CPC .. B03B 5/00; B03B 5/62; B03B 5/623; B03B 5/66; B03B 11/00; B01D 21/0024;
(Continued)

(56) References Cited

U.S. PATENT DOCUMENTS

| 1,410,152 A | 3/1922 | Allen |
| 2,426,839 A | 9/1947 | Morris |

(Continued)

FOREIGN PATENT DOCUMENTS

| CN | 101767051 A | 7/2010 |
| WO | WO 2001/045850 A1 | 6/2001 |

(Continued)

OTHER PUBLICATIONS

Corresponding International Search Report for PCT/AU2017/050377 dated Jun. 29, 2017. WO.

(Continued)

*Primary Examiner* — Charles A Fox
*Assistant Examiner* — Kalyanavenkateshware Kumar
(74) *Attorney, Agent, or Firm* — The Belles Group, P.C.

(57) ABSTRACT

The present invention provides an apparatus for feeding a feed slurry into a particle separator having a fluidisation source. The feed apparatus comprises a chamber having at least one baffle for dividing the chamber into a first zone and a second zone. A feed inlet feeds the slurry into the first zone (20) and the baffle deflects the slurry away from the second zone and direct fluidisation fluid from the fluidisation source through the second zone to combine with the slurry from the first zone. A particle separator incorporating the feed apparatus and a method of particle separation is also provided.

26 Claims, 7 Drawing Sheets

(58) Field of Classification Search
CPC ............ B01D 21/0039; B01D 21/0042; B01D 21/0045; B01D 21/0069
See application file for complete search history.

(56) References Cited

U.S. PATENT DOCUMENTS

| | | | |
|---|---|---|---|
| 2,967,617 A * | 1/1961 | Evans | ..................... B03B 5/623 209/158 |
| 3,075,643 A | 1/1963 | Delachanal | |
| 3,730,341 A * | 5/1973 | Mames | ................... B03B 5/623 209/164 |
| 5,264,645 A | 11/1993 | Hugues et al. | |
| 6,250,473 B1 * | 6/2001 | Golightley | .............. B03B 5/623 209/158 |
| 6,814,241 B1 | 11/2004 | Galvin | |
| 7,334,689 B2 | 2/2008 | Galvin et al. | |
| 2003/0234227 A1 | 12/2003 | Niitti | |
| 2013/0023397 A1 | 1/2013 | Galvin | |
| 2013/0200004 A1 | 8/2013 | Galvin | |
| 2014/0216986 A1 | 8/2014 | Orupold | |
| 2016/0074874 A1 | 3/2016 | Gardiner et al. | |
| 2016/0144376 A1 | 5/2016 | Gardiner et al. | |
| 2016/0214116 A1 | 7/2016 | Christodoulou | |
| 2016/0296942 A1 | 10/2016 | Starr et al. | |

FOREIGN PATENT DOCUMENTS

| | | |
|---|---|---|
| WO | 2008/064406 | 6/2008 |
| WO | WO 2008/064406 A1 | 6/2008 |
| WO | WO 2014/147593 A1 | 9/2014 |
| WO | WO 2016/019411 A1 | 2/2016 |
| WO | WO 2016/046705 A1 | 3/2016 |

OTHER PUBLICATIONS

European Search Report issued in European Application No. 17788425.1 dated Nov. 18, 2019.

* cited by examiner

(12) United States Patent

FEED APPARATUS FOR A PARTICLE SEPARATOR, PARTICLE SEPARATOR AND METHOD OF PARTICLE SEPARATION

FIELD OF THE INVENTION

The invention relates to a feed apparatus for a particle separator and in a particular to a feed apparatus for a particle separator for slurries containing low density and high density particles and/or a variety of particle sizes. The invention has been developed primarily for use as a particle separator for mineral slurries containing low density and/or smaller sized particles and high density and/or larger sized particles and will be described hereinafter by reference to this application.

BACKGROUND OF THE INVENTION

The following discussion of the prior art is intended to present the invention in an appropriate technical context and allow its advantages to be properly appreciated. Unless clearly indicated to the contrary, however, reference to any prior art in this specification should not be construed as an express or implied admission that such art is widely known or forms part of common general knowledge in the field.

Particle separators are widely used in industry. One type of particle separator is a fluidised bed classifier, which is used extensively in the coal and minerals industry for separating particles on the basis of density. Feed slurry enters the fluidised bed classifier, separating ultimately into a slurry of finer or lower density particles rising up through the vessel, and an underflow discharge of larger or higher density particles discharging from below. The lower portion of the system is supported by an upward current of fluidisation, usually delivered across the lower base of the vessel.

These classifiers exist in several configurations, with the simplest referred to as a teetered bed separator. The teetered bed separator essentially comprises a cylinder with its lower base shaped like a cone to funnel material (higher density particles) towards the underflow. A launder is located at the top of the cylinder around the outer rim to collect the overflow containing low density particles, while a centre feed well is located in the upper section of the cylinder to allow the entering feed slurry to disengage from the fluidising flow reporting to the overflow.

Another configuration is referred to as a reflux classifier, which comprises a system of inclined channels located above the cylinder, with the overflow launder located at the top above the inclined channels incorporating a series of internal launders to deliver the overflow to an external launder. In the reflux classifier the feed slurry is usually fed at an elevation close to the lower part of the inclined channels and is delivered either from above or adjacent to the system of inclined channels.

Another configuration related to the reflux classifier, known as an inverted reflux classifier, consists of an inverted fluidised bed, with the system of inclined channels located below the cylinder. In this case, the feed slurry simply enters through a wall via the vertical section of the system.

Yet another configuration is known as a graviton, which is effectively a reflux classifier located inside a centrifuge. In effect, the vertical axis of the reflux classifier is rotated 90° so that the axis is located radially from the shaft of the centrifuge.

Each of these particle separation systems requires significant fluidisation to support the suspension of particles and thus enable separation. The delivery of this fluidisation results in the addition of more fluid, usually water, and hence more energy. However, it is not possible to reduce the amount of fluidisation to reduce the energy consumption, since it would adversely impact on suspension of the particles. It would also adversely impact two additional functions of fluidisation. The first function is the fluidisation fluid facilitating the desliming, or cleaning, of the material prior to discharge to underflow. The second function is the fluidisation fluid providing a well-defined and uniform fluidisation condition to support the weight of the particles in the fluid, and in turn prevent mixing with the material being fed to the system. This second function is crucial to prevent short-circuiting and hence misplacement of the slurry material.

SUMMARY OF THE INVENTION

According to a first aspect of the invention, there is provided an apparatus for feeding a feed slurry into a particle separator having a fluidisation source, comprising:

a chamber having at least one baffle for dividing the chamber into a first zone and a second zone; and a feed inlet for feeding slurry into the first zone;

wherein the baffle is able to deflect the slurry away from the second zone and direct fluidisation fluid from the fluidisation source through the second zone to combine with the slurry from the first zone.

Preferably, the feed inlet is arranged to feed slurry tangentially with respect to a sidewall of the chamber.

Preferably, the feed inlet is arranged to feed slurry so as to induce a rotational flow of the slurry in the first zone.

Preferably, the feed inlet is located adjacent a sidewall of the chamber.

Preferably, there are two feed inlets located at opposite sides of a sidewall of the chamber. More preferably, there are four feed inlets located approximately at 90° intervals around the chamber.

Preferably, a mixing zone is formed in the chamber in which the fluidisation fluid from the second zone combines with the slurry from the first zone. In some embodiments, the mixing zone is formed at a discharge end of the chamber. In other embodiments, the mixing zone is formed at the upper end of the chamber.

Preferably, the chamber has diverging sidewalls. More preferably, the sidewalls diverge from the inlet end of the chamber. Alternatively, the sidewalls diverge towards the inlet end of the chamber. In one embodiment, the chamber is substantially frusto-conical in shape.

In some embodiments, the chamber is substantially cylindrical in shape.

Preferably, the baffle is substantially frusto-conical in shape, the second zone being formed inside the baffle and the first zone being formed between the outside of the baffle and the chamber. Alternatively, the baffle is substantially cylindrical in shape, the second zone being formed inside the baffle and the first zone being formed between the outside of the baffle and the chamber.

Preferably, the baffle is located adjacent to an inlet end of the chamber to create a gap between the baffle and the inlet end to permit denser particles to flow along at least one sidewall of the chamber through the gap. More preferably, the gap is annular in shape. In some embodiments, the gap has a width $\geq 3 \times \eta$ where $\eta$ is the largest particle size in the feed slurry.

Preferably, the particle separator is of the type having a plurality of inclined channels. Alternatively, the particle separator is a teetered bed separator comprising a cylindrical housing having the fluidisation chamber disposed beneath a removal device for removing the low density and/or smaller sized particles. In one embodiment, the removal device comprises a launder.

A second aspect of the present invention provides an apparatus for separating low density and/or smaller sized particles from feed slurries, comprising the apparatus of the first aspect of the invention; a plurality of inclined channels located adjacent a first end of the chamber; and a fluidisation source for directing the fluidisation fluid towards the second zone, the fluidisation source being located adjacent a second end of the chamber.

A third aspect of the present invention provides an apparatus for separating low density and/or smaller sized particles from feed slurries, comprising the apparatus of the first aspect of the invention; a removal device for removing low density and/or smaller sized particles, the removal device being located adjacent a first end of the chamber; and a fluidisation source for directing the fluidisation fluid towards the second zone, the fluidisation source being located adjacent a second end of the chamber.

Preferably, the fluidisation source comprises a fluidisation chamber having a fluidising bed to generate a fluidisation fluid from the fluid; the baffle being located adjacent to the second end of the chamber to create a gap between the baffle, the second end and the fluidisation chamber to permit denser particles to flow along at least one sidewall of the chamber into the fluidisation chamber.

Preferably, the ratio of the height of the fluidised bed height to the fluidisation chamber diameter is ≥1.

Preferably, the ratio of the combined height of the fluidisation chamber and the baffle to the fluidisation chamber diameter is ≥2.

Preferably, the ratio of the height of the apparatus to the fluidisation chamber diameter is ≥3.

Preferably, the fluidisation chamber is substantially frusto-conical in shape. Alternatively, the fluidisation chamber is substantially cylindrical in shape.

Preferably, the baffle has an internal diameter that is substantially the same as a diameter of the fluidisation chamber. Alternatively, the baffle has an internal diameter that is different to a diameter of the fluidisation chamber.

The second and third aspects of the present invention may also have the preferred features described in relation to the first aspect of the present invention. For example, the gap may have has a width ≥3×η where η is the largest particle size in the feed slurry.

A fourth aspect of the present invention provides a method for feeding slurry into a particle separator having a fluidisation source, comprising:

dividing a chamber into a first zone and a second zone;
feeding the slurry into the first zone;
deflecting the slurry away from the second zone; and
directing fluidisation fluid from the fluidisation source through the second zone to create a fluidisation flow that combines with the slurry from the first zone.

Preferably, the method further comprises feeding the slurry tangentially with respect to a sidewall of the chamber.

Preferably, the method further comprises feeding the slurry so as to induce a rotational flow of the slurry in the first zone.

Preferably, the method further comprises feeding the slurry at opposite sides of a sidewall of the chamber.

Preferably, the second zone is surrounded by the first zone.

Preferably, a baffle divides the chamber to form the first zone and the second zone. More preferably, the method further comprises locating the baffle adjacent an inlet end of the chamber to create a gap between the baffle and the inlet end to permit denser particles to flow along at least one sidewall of the chamber through the gap.

Preferably, the method further comprises providing the baffle with a substantially cylindrical shape. Alternatively, the method further comprises providing the baffle with a substantially frusto-conical shape.

Preferably, the method comprises forming a mixing zone in the chamber in which the fluidisation flow from the second zone combines with the slurry from the first zone. In some embodiments, the method comprises forming the mixing zone at a discharge end of the chamber. In other embodiments, the method comprises forming the mixing zone at the upper end of the chamber.

Preferably, the method further comprises forming the chamber with diverging sidewalls to direct the flow of denser particles in the chamber. More preferably, the sidewalls diverge from the inlet end of the chamber. Alternatively, the sidewalls diverge towards the inlet end of the chamber.

Preferably, the method further comprises allowing the slurry to flow downwardly through a plurality of inclined channels located adjacent a first end of the chamber such that the low density and/or smaller sized particles escape the fluidisation flow by being entrained up the inclined channels while the denser and/or larger sized particles in the slurry slide down the channels; and removing the low density particles, smaller sized particles, the denser particles or the larger sized particles from the particle separator.

Preferably, the fluidisation source comprises a fluidisation chamber having a fluidising bed to create a fluidisation fluid and the method further comprises locating the baffle adjacent to the second end of the chamber to create a gap between the baffle, the second end and the conduit to permit denser particles to flow along at least one sidewall of the chamber into the fluidisation chamber.

Preferably, the method comprises configuring the fluidisation chamber so that the ratio of the height of the fluidised bed height to the fluidisation chamber diameter is ≥1.

Preferably, the method comprises configuring the fluidisation chamber and baffle so that the ratio of the combined height of the fluidisation chamber and the baffle to the fluidisation chamber diameter is ≥2.

Preferably, the method comprises configuring the fluidisation chamber so that the ratio of the height of the apparatus to the fluidisation chamber diameter is ≥3.

Preferably, the method comprises forming the baffle with an internal diameter substantially the same as a diameter of the fluidisation chamber. Alternatively, the method comprises forming the baffle with an internal diameter that is different to a diameter of the fluidisation chamber.

The method may also incorporate preferred features of the first, second and third aspects of the present invention stated above, where applicable. Again, for example, the method may comprise providing or configuring the gap to have a width ≥3×η where η is the largest particle size in the feed slurry Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Furthermore, as used herein and unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

BRIEF DESCRIPTION OF THE DRAWINGS

Preferred embodiments of the invention will now be described, by way of example only, with reference to the accompanying drawings in which.

PREFERRED EMBODIMENTS OF THE INVENTION

The present invention will now be described with reference to the following examples which should be considered in all respects as illustrative and non-restrictive. In the Figures, corresponding features within the same embodiment or common to different embodiments have been given the same reference numerals.

Often reference is made to the reporting of the denser particles to the underflow and the lower density particles to the overflow. But those skilled in the art will appreciate that quite fine dense particles will report to the overflow and excessively larger lower density particles will report to the underflow. More generally, faster settling particles report to the underflow and slower settling particles report to the overflow, but in many separators the system geometry and the state of the suspension can influence this result as well. Under relatively dilute conditions coarser (larger sized) particles will tend to report to the underflow and finer (smaller sized) particles to the overflow. Clearly, systems involving particles with a distribution of sizes and densities are complex in their response. Hence, for the purpose of describing embodiments of the invention, a simpler description has been applied throughout, with reference to the denser or larger sized particles (e.g. faster settling) reporting to the underflow and lower density or smaller sized particles reporting to the overflow. This simpler description should not be seen to limit in any way the application of this invention.

Figure 1:
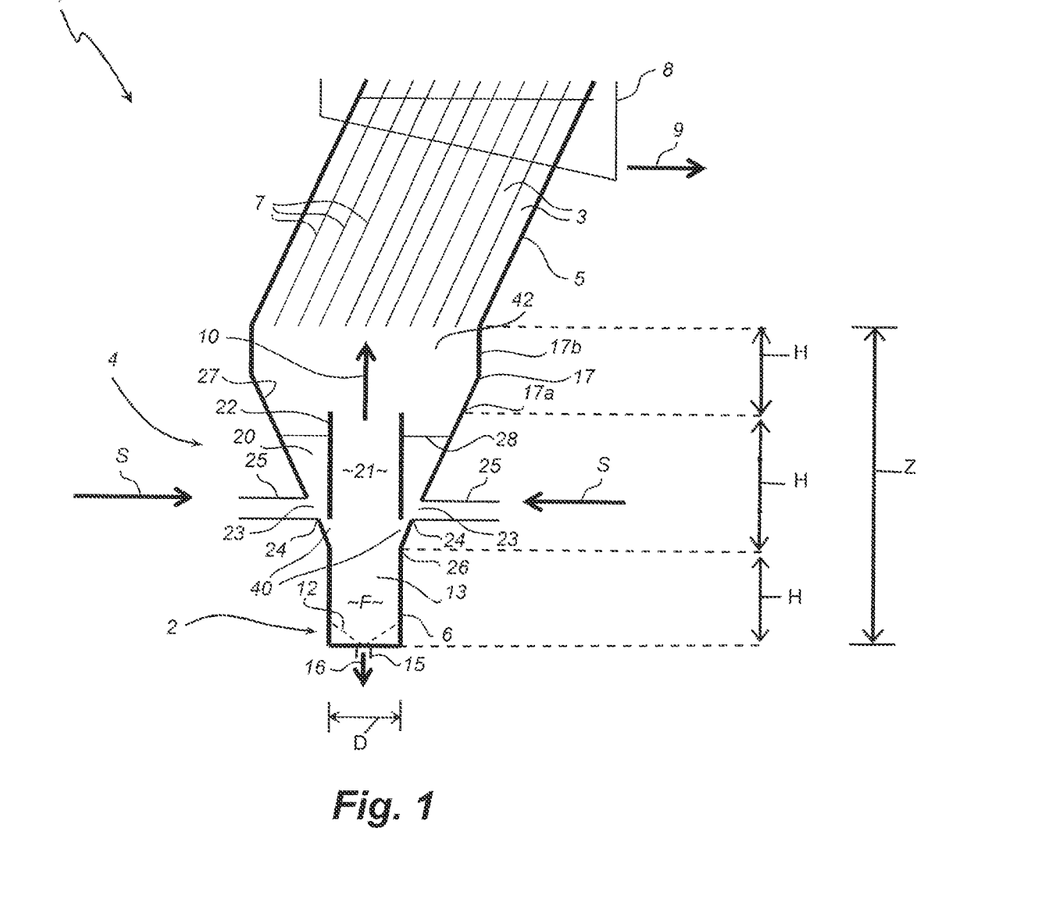
FIG. 1 is a cross-sectional view of an apparatus according to one embodiment of the invention.

Referring to FIG. 1, a particle separator 1 is illustrated, comprising a fluidisation source 2, a plurality of inclined channels 3 and an apparatus 4 for feeding slurry S into the particle separator according to one embodiment of the invention. In this embodiment, the particle separator 1 is configured to act as a reflux classifier. As such, the inclined channels 3 are located in an upper part 5 of the particle separator 1 and the fluidisation source 2 is located in a lower part 6. The inclined channels 3 are formed by a series of inclined plates 7. A launder 8 is located at the top of the chamber 5 for receiving and removing an overflow 9 of low density and/or smaller sized particles that migrate upwardly through the action of an upward fluidisation flow 10 from the fluidisation source 2. The fluidisation source 2 comprises a distributor 12 at the bottom of a fluidisation chamber 13 formed in the lower part 6. The distributor 12 creates a fluidised bed that directs the fluidisation flow 10 upwards in the particle separator 1. An outlet 15 in the lower part 6 discharges an underflow 16 of denser particles.

Figure 2:
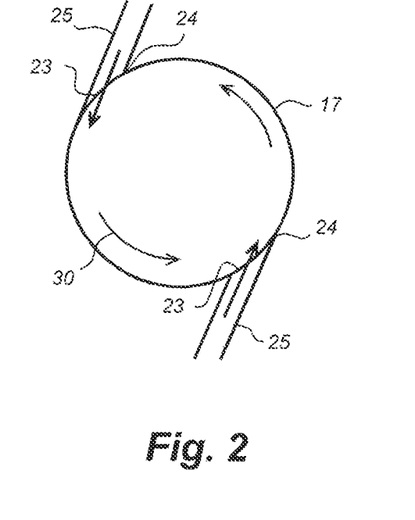
FIG. 2 is a schematic drawing of a plan view of the apparatus of FIG. 1.

The feeding apparatus 4 comprises a chamber 17 divided into an outer zone 20 and an inner zone 21 by a baffle 22. Two feed inlets 23 for feeding the slurry S into the outer zone 20 are located on opposite sides 24 of the chamber 17 with conduits 25 for delivering the slurry, as best shown in FIG. 2. The baffle 22 in this embodiment comprises a substantially cylindrical pipe or tube that is located adjacent a lower end 26 of the chamber 17 and mounted to the sidewalls 27 of chamber 17 via support members 28 near the top of the baffle 22. The chamber 17 has a conical section 17a and a cylindrical section 17b, the conical section being connected to the fluidisation chamber 13 and the cylindrical section being connected to the upper part 5 of the particle separator. Thus, the cylindrical section 17b forms a discharge end of the feeding apparatus 4. The conical section 17a of the chamber 17 extends downwardly with steep sidewalls 27 to ensure that denser particles are readily transported downwards rather than adhere to the sidewalls.

The fluidisation chamber 13 can be seen essentially as a cylinder of much smaller diameter that intersects the conical section 17a of the chamber 17. The smaller diameter assists with providing an appropriate fluidised bed height to diameter ratio, which facilitates a more uniform movement of the material within a fluidisation zone F formed within the particle separator. With a smaller diameter, there is less fluidisation water required, and hence fewer fluidisation nozzles to install or maintain. Thus, the total fluid flow reporting to the system overflow 9 is lower, and thus it is easier to prevent fine denser particles from reaching the overflow. It is preferred that the fluidised bed height (as defined by the height of the fluidisation chamber 13) to diameter ratio is equal to or greater than one. It is also preferred that the length of the baffle is equal to the height of the fluidisation chamber 13. Hence, it is thus preferred that the ratio of the combined height of the fluidisation chamber 13 and baffle 22 to the diameter is greater than two. It is also preferred that the space above the baffle 22 has the same height as the fluidisation chamber 13. These preferred ratios are illustrated in FIG. 1 (although the figure is not to scale), where the heights of the fluidisation chamber 13, baffle 22 and the space above the baffle 22 are each the same and indicated by distance H while the diameter of the fluidisation chamber 13 is indicated by distance D. Thus, the fluidised bed height to diameter ratio is $H/D \geq 1$, the combined height of the fluidisation chamber 13 and baffle 22 to the diameter ratio is $2H/D \geq 2$ and the height Z of the entire feed apparatus 4 to diameter ratio is $3H/D \geq 3$.

In having a smaller diameter for the fluidisation zone, there are a number of beneficial effects on the transport of material (being the denser particles) to the underflow 16 via the outlet 15. Firstly, if the solids flow to the underflow 16 is relatively small compared to the flow of the incoming feed slurry S, then it is easier to establish a bed of the high density particles in a smaller zone. This effect applies to mineral sands feed of a low grade, where the underflow solids rate will be low. Thus, there would still be a net flow 10 of fluidisation water upwards through the bed, providing quality desliming. The desliming may also be achieved at a lower fluidisation flow rate, and hence ultrafine heavy minerals (being denser particles) are less likely to report to the overflow 9. Where the feed slurry S that requires to discharge a higher proportion of material to the underflow 16, the diameter of cylindrical fluidisation zone F is simply increased by increasing the diameter of the fluidisation chamber 13. Thus, the design of the fluidisation chamber can be tailored to any specific purpose.

Figure 3:
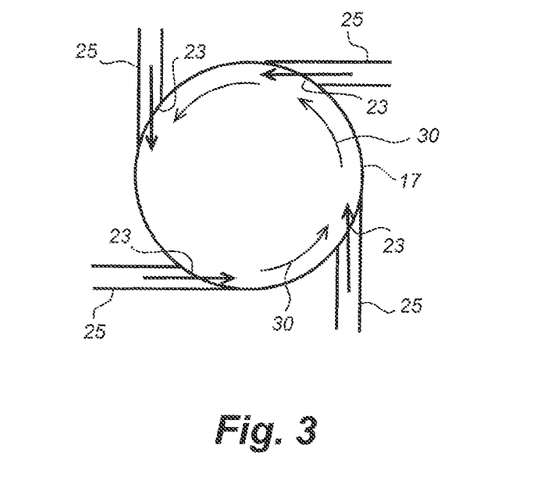
FIG. 3 is a schematic drawing of a plan view of another embodiment of the apparatus of FIG. 1.

The feed slurry S enters the chamber 17 at feed inlets 23 just above the point of intersection between the conical section 17a and fluidisation cylinder 13. In this embodiment, the feed slurry S ideally enters tangentially to the sidewall 27, generating a rotational flow 30, as best shown in FIG. 2. This rotational flow 30 tends to transport the larger and denser particles downwards and along the wall towards the lower end 24. In this way, the energy of the entering feed slurry S is used to provide some of the energy required to support the suspension of particles in the particle separator 1. In other embodiments, the feed slurry S enters tangentially to the sidewall 27 at up to four locations, separated by 90°, in a fashion that assists with generating the rotational flow 30 in the one direction, as best shown in FIG. 3. In yet other embodiments, additional tangential entry points are used to deliver the feed. In further embodiments, the tangential entry points are not in the same horizontal plane but can be located at different heights of the chamber 17.

The baffle 22 is located so that a gap 40 is formed between the baffle and the lower end 24 of the chamber 17. Due to the cylindrical shape of the baffle 22, the gap 40 has an annular or ring shape between the baffle 22 and the fluidisation chamber 13. It will be appreciated that where the baffle 22 has a different shape, such as a conical or inverted conical shape, the gap 40 will also have a different shape. The descending larger and denser particles from the rotational flow 30 pass through the gap 40 into the fluidisation chamber 13. The gap 40 can be made as wide as necessary to prevent possible blockages. In general, the gap 40 must be larger than the largest possible particle size fed into the particle separator 1, and preferably is larger than this size by a factor of 3 or greater. That is, if the largest particle size is designated as $\eta$, the gap 40 should be $\geq 3 \times \eta$. Also, oversize protection would usually be applied to the feed slurry ahead of the particle separator 1. In some embodiments, additional water or fluid is injected into this vicinity if blockage of the gap 40 is anticipated. The horizontal support members 28 could also double as conduit to deliver additional fluidisation water, if required. This means that the effective height to diameter ratio becomes even more favourable for fluidisation.

The location of the cylindrical baffle 22 adjacent the fluidisation chamber 13 means that the baffle 22 effectively extends the height of the cylindrical fluidisation zone F in the fluidisation chamber 13, since the fluidisation flow 10 flows upwards past the fluidisation zone F into and through the inner zone 21 of the baffle 22. This extension of the fluidisation zone F into the inner zone 21 is partly facilitated by the baffle 22 having an internal diameter substantially the same or equal to the diameter of the fluidisation chamber 13. In some embodiments, the inner diameter of the baffle 22 need not be the same as the diameter of the fluidisation chamber 13. For example, the baffle 22 may have a conical configuration, where its internal diameter is initially the same or close to being the same as the diameter of the fluidisation chamber 13 then progressively increases in diameter. Likewise, the baffle 22 may have an inverted conical configuration, where its internal diameter is initially the same or close to being the same as the diameter of the fluidisation chamber 13 then progressively decreases in diameter. Finally, the baffle may have smaller and/or larger internal diameter relative to the diameter of the fluidisation chamber 13. However, it is generally preferred that the internal diameter of the baffle 22 is substantially the same or equal to the diameter of the fluidisation chamber 13.

The cylindrical baffle 22 is also like an immersed feed well, assisting with distributing the vast majority of the entering feed slurry S externally of the baffle, deflecting the slurry S upwards and away from the vicinity of the cylindrical fluidisation zone 13. Clearly, relatively large or high density particles will have a tendency to slide or flow downwards along the sidewall 27 through the gap 40 between the cylindrical baffle 22 and the cylindrical fluidisation zone F. This movement prevents potential blockages and is an ideal situation, given that it is more than likely that this material would have a tendency to join the underflow 16.

Once located within the fluidisation chamber 13, however, these particles would either be processed downwards to the underflow 16 or be displaced upwards and out of the fluidisation zone F, depending on the system hydrodynamics. The volumetric flow of this material composed of larger and denser particles would be miniscule compared to that of the flow of the overall feed slurry S. Consequently, this material would not adversely disturb the uniform state of fluidisation in the fluidisation chamber 13.

Thus, in operation, the vast majority of the overall feed slurry S would rotate along the rotational flow 30 in the chamber 17 around the outer wall of the cylindrical baffle 22 while tending to flow upwards. The fluidisation flow from the inner zone 21 of the baffle 22 combines with the slurry S from the outer zone 20, preferably in a mixing zone 42. In this embodiment, the mixing zone 42 is located at an upper region or end of the chamber 17 end adjacent the cylindrical section 17b corresponding to the discharge. The energy of the entering feed slurry S assists with conveying, and importantly, supporting much of the slurry material suspended above in the conical section 17a. Hence, there will be little or no tendency for the slurry material to sediment and adhere to the sidewall 27 of the conical section 17a. Consequently, there is no need to provide separate fluidisation water in the chamber 17 to suspend the slurry S at this radial distance from the centre of the particle separator 1. However, a limited level of water injection may be used to assist with the rare possibility of a blockage. The energy of the feed slurry S and its volumetric flow is thus utilised for the purpose of supporting the suspension in the outer zone 20 in the conical section 17a.

Ultimately, the flow of feed slurry is directed upwards through conical section 17 and then cylindrical section 17b of the chamber 17 towards the system of inclined channels 3, especially in the outer radial area of the separator 1, providing better and more uniform support across all the inclined channels. This beneficial effect as a result of this embodiment of the invention is in contrast to the usual mode of operating a reflux classifier, with the feed entering downwards from a location just below the inclined channels, being forced to reverse direction by the fluidisation flow, and then travel upwards through the inclined channels. In this situation of a conventional reflux classifier, the flow up through the inclined channels is more concentrated centrally, and thus there is a non-uniform distribution of the material in the inclined channels. Thus, in the present embodiment of the invention, there is a more efficient use of the inclined channels and hence more efficient use of the particle separator 1.

Another advantage of the described configuration is that, in some instances, it also saves space by delivering the feed slurry S into the chamber 17 near the lower end 26. Consequently, the upper section or part 5 of the particle separator 1 can be used to deploy the inclined channels 3 and the launder 8 more efficiently, without the need to compromise the design of the upper part or section 5.

Furthermore, solids (i.e. denser particles) returning from the inclined channels 3 will move downwards along the sidewall 27 towards the fluidisation chamber 13. Those solids located above the cylindrical fluidisation zone F tend to be transported into the cylindrical fluidisation zone F due to the upward flow velocity being lower than elsewhere. Those solids outside of the fluidisation zone F remixes with the feed slurry S, building up in concentration. This means that the solids that tend to reflux within the particle separator 1 will build their concentration to a level necessary for their transport into the cylindrical fluidisation zone F of the fluidisation chamber 13.

Figure 4:
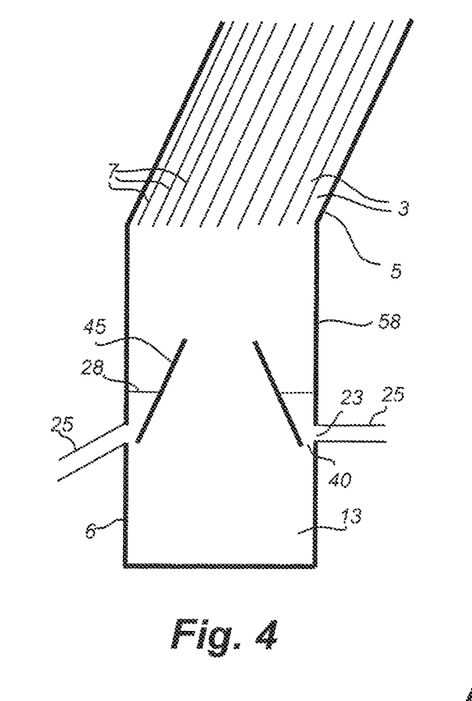
FIG. 4 is a cross-sectional view of an apparatus according to a further embodiment of the invention.
Figure 5:
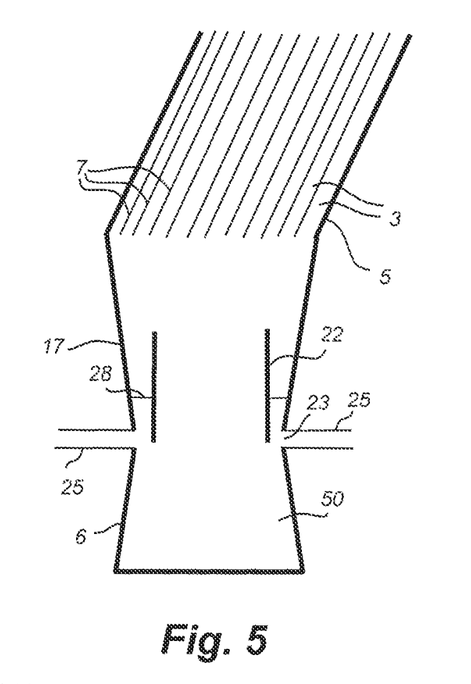
FIG. 5 is a cross-sectional view of an apparatus according to another embodiment of the invention.
Figure 6:
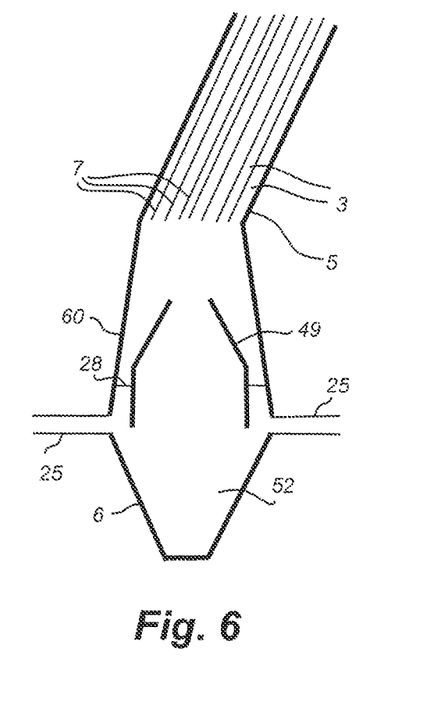
FIG. 6 is a cross-sectional view of an apparatus according to yet another embodiment of the invention.
Figure 7:
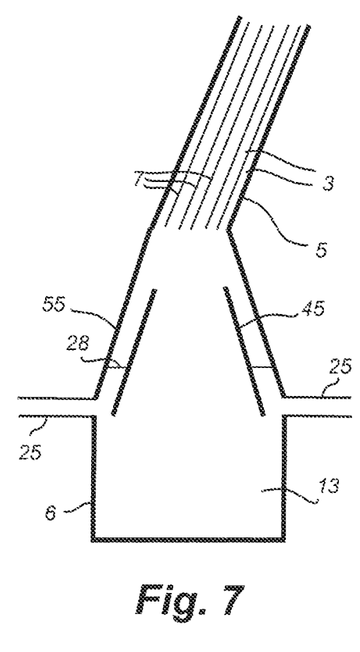
FIG. 7 is a cross-sectional view of an apparatus according to a further embodiment of the invention.
Figure 8:
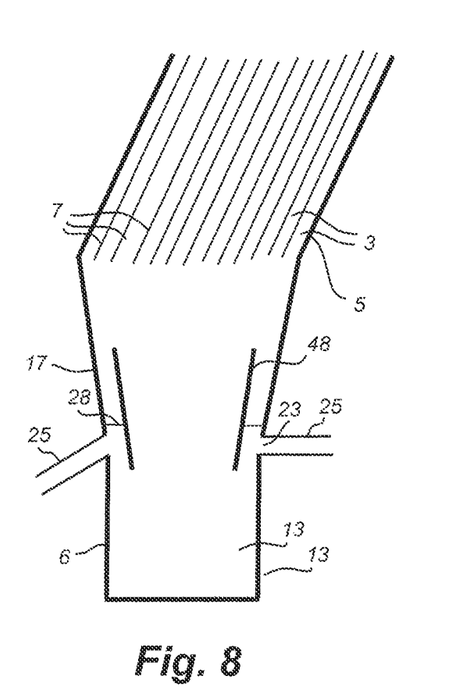
FIG. 8 is a cross-sectional view of an apparatus according to a further embodiment of the invention.

It will be appreciated that there are many possible variations that can be applied to this design, as shown in FIGS. 4 to 11, which are not to scale but are intended to have the preferred bed height to diameter ratio of H/D≥1, the combined height of the fluidisation chamber 13 and baffle 22 to the diameter ratio of 2H/D≥2 and the height of the entire feed apparatus 4 to diameter ratio of Z=3H/D≥3. For example, the cylindrical baffle 22 could be replaced by a conical shaped baffle 45 (as best shown in FIGS. 4 and 7), an inverted conically shaped baffle 48 (as best shown in FIG. 8) or a baffle 49 that is part conical and part cylindrical (as best shown in FIG. 6). In another example, the cylindrical fluidisation chamber 13 could also be replaced by a conical shaped chamber 50 (as best shown in FIG. 5) a conical shaped chamber 52 (as best shown in FIG. 6). Yet another example changes the feed apparatus chamber from a frusto-conical shape to a pure conical shape 55 (as best shown in FIG. 7), cylindrical shape 58 (as best shown in FIG. 4) or an inverted conical shape 60 (as best shown in FIG. 6). In a further example, in all cases, the conical shapes are replaced by rectilinear inverted pyramids or similar polyhedral geometries.

Figure 9:
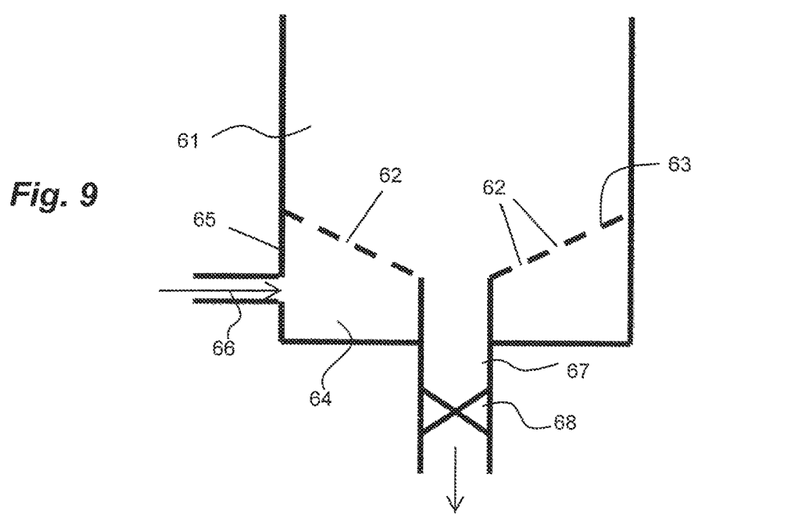
FIG. 9 is a cross-sectional view of a portion of an apparatus according to yet another embodiment of the invention.
Figure 10:
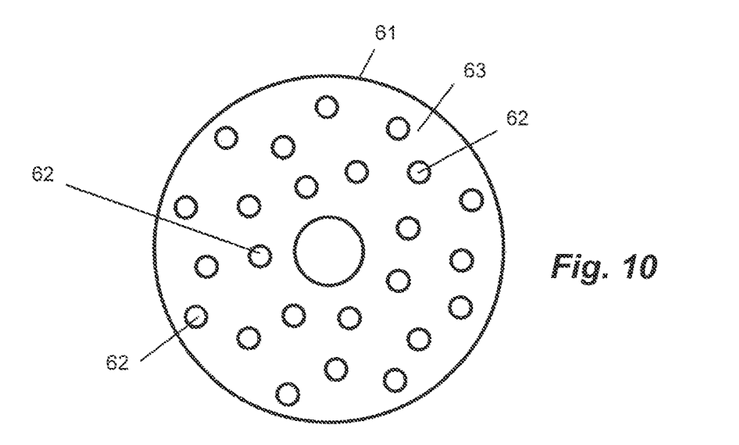
FIG. 10 is a plan view of the apparatus of FIG. 9.
Figure 11:
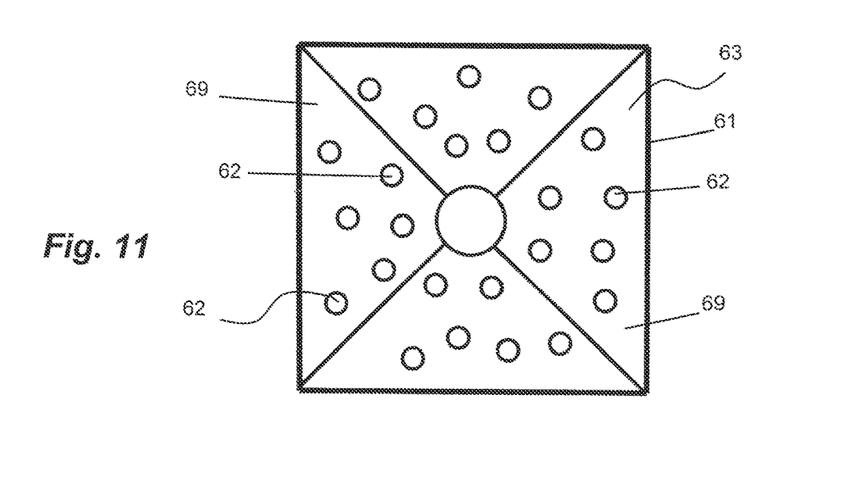
FIG. 11 is a plan view of an alternative to the apparatus of FIG. 9.

In FIG. 9, a simplified schematic drawing illustrates a chamber 61 having openings or holes 62 in its inner surface 63 to form a fluidised bed from fluidisation fluid being into the area 64 between the inner surface 63 and an outer surface 65 from a fluidisation source 66. An underflow discharge conduit in the form of a pipe 67 is provided with a control valve 68. The control valve 68 is preferably linked to receive signals from two pressure transducers (not shown). If the measured suspension density exceeds a set point or value, the control valve 68 opens, whereas below or at the set point, the control valve 68 closes. In this way, the denser and/or larger sized particles are easily and conveniently removed from the apparatus 4. FIGS. 10 and 11 illustrate two forms of the apparatus of FIG. 9. FIG. 10 illustrates the chamber 61 in top or plan view where the chamber has a conical shape so that the openings 62 are formed in the inner surface 63 of the cone. FIG. 11 illustrates the chamber 61 in top or plan view were the chamber has an inverted pyramidal shape so that the openings 62 are formed in the inner surface 63 of the inverted pyramid defined by four connected inclined part-triangular plates 69.

One advantage of a conical fluidisation chamber 50, 52 (and hence a conical shaped fluidisation zone) is that the effective fluidisation velocity is higher at the base allowing coarser particles to be suspended, while delivering lower fluidisation velocities at higher elevations. This encourages more of the fine denser particles to reach the underflow 16. A similar effect may also be achieved by using a conical shaped baffle 45, 48, reducing the velocities in the upper zone, and providing inclined surfaces to support the sedimentation of the particles towards the underflow. In each of these variations to the shapes of the chamber 17, baffle 22 and fluidisation chamber 13, the feed apparatus 4 will still work in substantially the same way as described in relation to FIGS. 1 and 2.

In some embodiments, the feed inlets 23 and conduits 25 are modified to create a feed arrangement similar to a cyclone, with higher feed entry pressures to achieve stronger centrifugal forces. In other embodiments, there is only one feed inlet 23. In yet other embodiments, the feed conduit(s) 25 are angled to a centre axis of the chamber 17 so produce an upwardly directed rotational flow, as best shown FIGS. 4 and 8.

Figure 12:
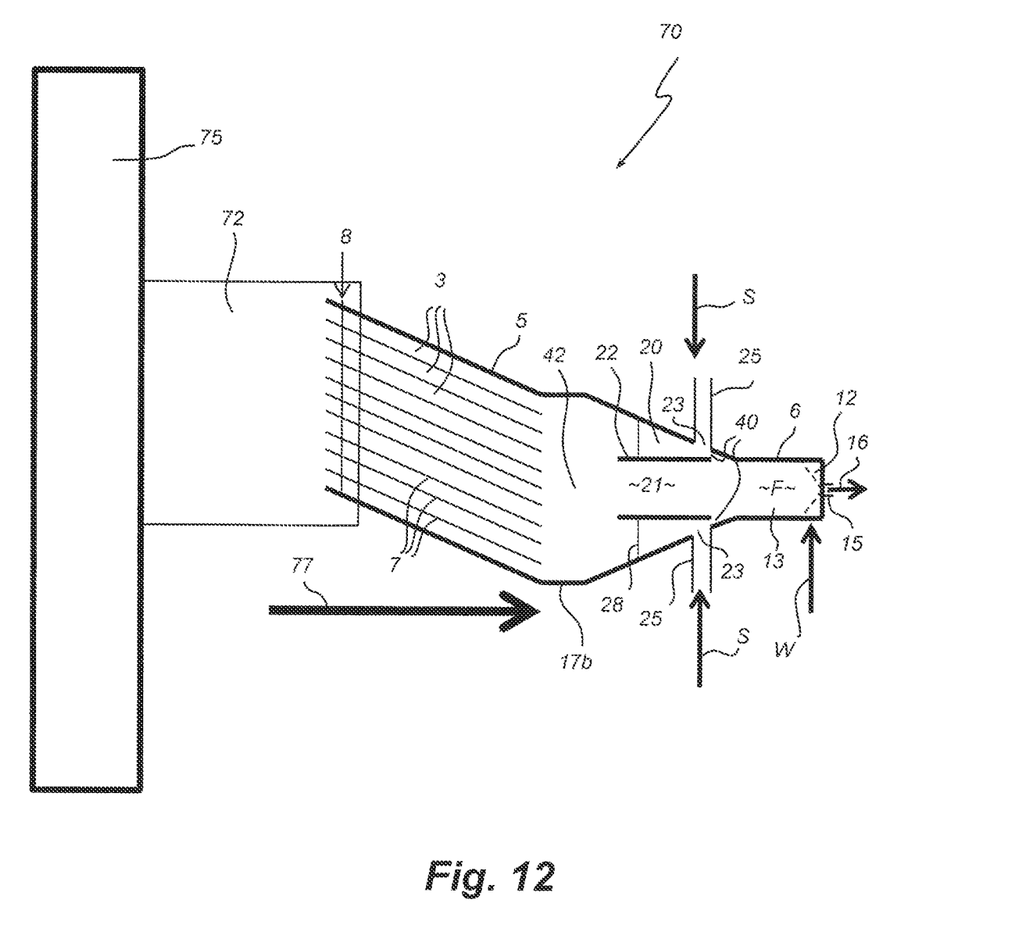
FIG. 12 is a cross-sectional view of an apparatus according to a further embodiment of the invention.

Referring to FIG. 12, another embodiment of the invention is illustrated but not to scale, where the particle separator is configured as a graviton or centrifuge 70 having a plurality of radial arms 72 mounted to a central rotary shaft 75. An assembly 76 is mounted at the end of each radial arm and comprises the inclined channels 3, fluidisation source 2 and the feeding apparatus 4. In the embodiment, the assembly 76 is able to advantageously incorporate the fluidisation zone F within a relatively small space within the assembly 76 due to the arrangement of the feeding apparatus 4, as much of the space is occupied by the system of inclined channels 3. The feeding apparatus 4 in the graviton 70 greatly reduces the quantity of fluidisation water W required, and also improves the height to diameter ratio of the fluidisation zone F, thus producing a more uniform fluidisation zone, and hence better quality desliming. The overall length of the fluidisation zone F (including the inner zone 21 of the baffle 22) leading up to the inclined channels 3 can thus be made much shorter. Moreover, the high feed flow rate assists with preventing feed solids from caking onto the inner surfaces of the graviton 70 near where the centrifugal forces 77 are higher because the reduced fluidisation flow rate means that the fluidisation velocities (and hence centrifugal forces) are lower.

Figure 13:
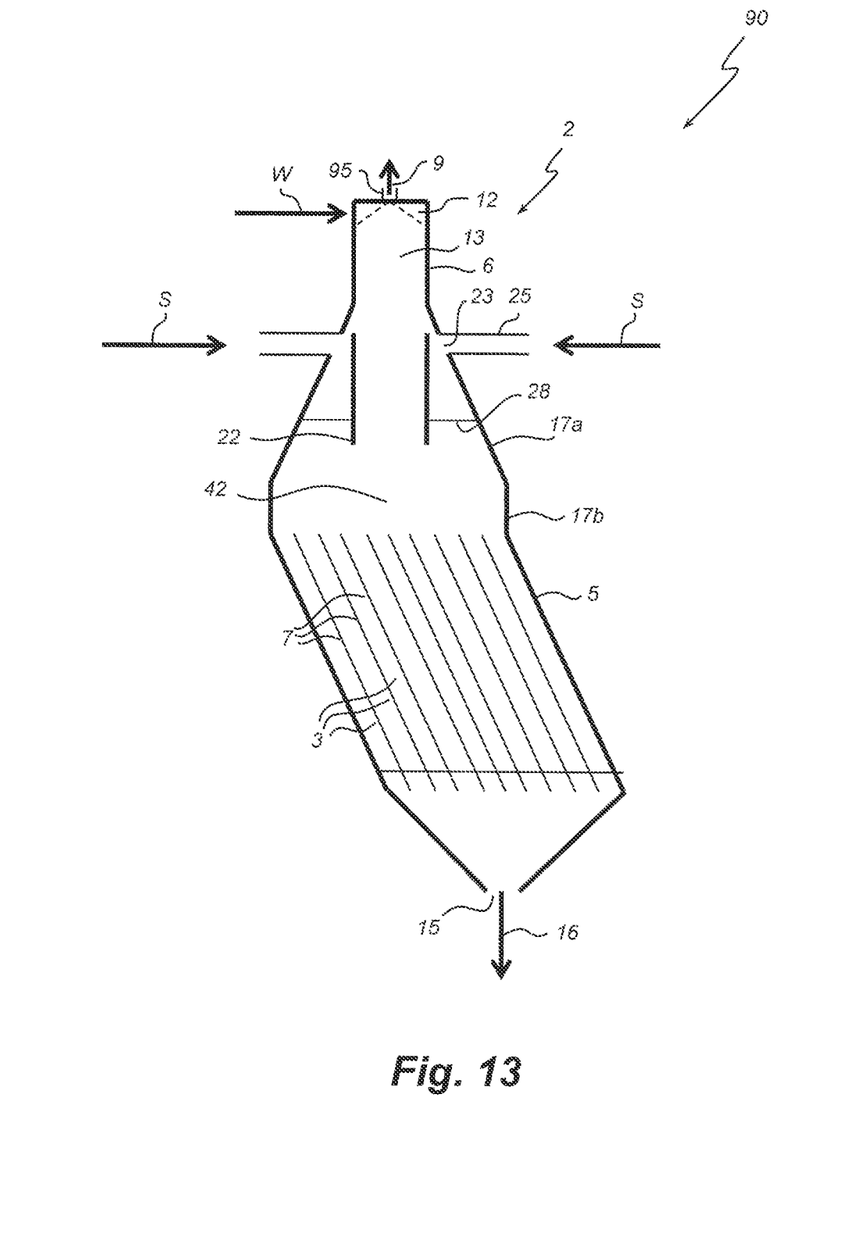
FIG. 13 is a cross-sectional view of an apparatus according to yet another embodiment of the invention.

Referring to FIG. 13, a further embodiment of the invention is illustrated but not to scale, where the particle separator is configured as an inverted reflux flotation cell 90. In this embodiment, the outer zone 20 of the baffle 22 becomes a disengagement zone 91 to allow the denser particles in the form of tailings to flow downwards towards the inclined channels 3, while permitting the bubbly mix, generated externally, to rise upwards and into the inner zone 21 of the baffle 22 and then into the cylindrical fluidisation zone F. In this way, the bubbles in the bubbly mix are protected in the inner zone 21 from the turbulence created by the large entering flow of feed slurry S through the inlets 23 into the outer zone 20, reducing the tendency for larger particles to dislodge from the bubbles. The cylindrical baffle 22 in some embodiments may extend down further toward or even be close to inclined channels 3. This arrangement is more likely to cause the inclined channels 3 to partially flood, forcing the bubbly zone into the inclined channels 3. This results in important benefits as it produces a stable and self-controlled interface between the bubbly mix and the tailings. Furthermore, the more improved height to diameter ratio should result in much better downwards fluidisation and hence desliming of the product overflow 9.

While the embodiment of FIG. 1 has the mixing zone 42 at an upper end of the chamber 17, it should be noted that the mixing zone 42 is not at the upper end of the chamber in the embodiments of FIGS. 12 and 13. Rather, the mixing zone 42 is located at the discharge end of the chamber 17 adjacent the inclined channels 3 (which is to one side of the graviton 70 in FIG. 12 and in the middle of the inverted reflux flotation cell 90 in FIG. 13).

The invention may also be used with other types of flotation-based particle separators, such as an inverted reflux classifier. In the case of the inverted reflux classifier, the same technical benefits of the reflux flotation cell are achieved for the inverted reflux classifier using the feeding apparatus of the embodiment of FIG. 12 as the inverted reflux classifier is usually used to process particles less dense than the fluid, separating them from denser particles.

It will further be appreciated that any of the features in the preferred embodiments of the invention can be combined together and are not necessarily applied in isolation from each other. For example, the feature of a baffle with a conical shape as shown in FIG. 4 can be used in the graviton 70 of FIG. 9 or the inverted flotation cell 90 of FIG. 12. Likewise, any of the configurations shown in FIGS. 5 to 8 may also be used in the graviton 70 of FIG. 9 or the inverted flotation cell 90 of FIG. 12. Similar combinations of two or more features from the above described embodiments or preferred forms of the invention can be readily made by one skilled in the art.

By providing a feeding apparatus for the slurry into the particle separator where a baffle separates a chamber into two zones, the invention enables the energy of the incoming feed slurry to suspend the particles in the particle separator, reducing the demand for additional fluidisation fluid or a higher fluidisation fluid flow rate, and ensures a more uniform distribution of particles across the inclined channels is achieved. In addition, the invention enables a fluidisation zone that is more efficient, again reducing the demand for fluidisation fluid. Moreover, the baffle also advantageously facilitates the efficient use of the fluidisation fluid to efficiently separate low density and/or smaller sized particles from the slurry. All these advantages of the invention result in a feeding apparatus that is applicable to a variety of particle separators, and results in the particle separator operating more efficiently in separating the low density and/or smaller sized particles from the slurry, using energy more efficiently, and consuming less water/fluid for fluidisation, while permitting more water and solids in the feed. Furthermore, the invention can potentially be retrofitted to existing particle separators. In all these respects, the invention represents a practical and commercially significant improvement over the prior art.

Although the invention has been described with reference to specific examples, it will be appreciated by those skilled in the art that the invention may be embodied in many other forms.

The invention claimed is:

1. An apparatus for feeding a feed slurry into a particle separator, comprising:
    a chamber having at least one tubular baffle therein for dividing the chamber into a first zone and a second zone, the second zone being formed inside the baffle and the first zone being formed between the outside of the baffle and the chamber, the baffle having a first opening facing a fluidization source and a second opening facing a part of the particle separator having inclined channels formed by a series of inclined plates;
    the fluidisation source having a fluidisation outlet for feeding a fluidisation fluid into the first opening of the baffle; and
    a feed inlet to the chamber for feeding the slurry into the first zone;
    wherein the baffle deflects the slurry away from the second zone and directs fluidisation fluid from the fluidisation source through the first opening of the baffle, the second zone, and the second opening of the baffle to combine with the slurry from the first zone in a mixing zone provided between the second opening of the baffle and the part of the particle separator having inclined channels formed by a series of inclined plates.

2. The apparatus of claim 1, wherein the feed inlet is arranged to feed the slurry tangentially with respect to a sidewall of the chamber to induce a rotational flow of the slurry in the first zone.

3. The apparatus of claim 1, wherein there are two feed inlets located at opposite sides of a sidewall of the chamber proximate to the first opening of the baffle to feed the feed slurry at a point above the intersection between the chamber and the fluidisation source.

4. The apparatus of claim 1, wherein the chamber has sidewalls that diverge from the feed inlet to the chamber.

5. The apparatus of claim 1, wherein the chamber is cylindrical or frusto-conical in shape.

6. The apparatus of claim 1, wherein the baffle is located adjacent one end of the chamber to create a gap annular in shape between the baffle and the one end to permit denser and/or larger sized particles to flow along at least one sidewall of the chamber through the gap.

7. The apparatus of claim 6, wherein the gap has a width $\geq 3 \times \eta$ where $\eta$ is the largest particle size in the feed slurry.

8. An apparatus for separating low density and/or smaller sized particles from feed slurries, said apparatus comprising:
    the feeding apparatus of claim 1;
    wherein the plurality of inclined channels are located adjacent a first end of the chamber; and
    wherein the fluidisation source is located adjacent a second end of the chamber.

9. The apparatus of claim 8, wherein the fluidisation source comprises a fluidisation chamber having a fluidising bed to create a fluidisation fluid, the baffle being located adjacent to the second end of the chamber to create a gap annular in shape between the baffle, the second end and the fluidisation chamber to permit denser and/or larger sized particles to flow along at least one sidewall of the chamber into the fluidisation chamber.

10. The apparatus of claim 9, wherein (a) the ratio of the height of the fluidised bed height to the fluidisation chamber diameter is $\geq 1$; (b) the ratio of the combined height of the fluidisation chamber and the baffle to the fluidisation chamber diameter is $\geq 2$; or (c) the ratio of the height of the apparatus to the fluidisation chamber diameter is $\geq 3$.

11. The apparatus of claim 9, wherein the gap has a width $\geq 3 \times \eta$ where $\eta$ is the largest particle size of the feed slurry.

12. The apparatus of claim 1, where the baffle is frusto-conical or cylindrical in shape.

13. The apparatus of claim 1, wherein the baffle is centrally located at one end of the chamber.

14. The apparatus of claim 1, wherein the internal diameter of the baffle gradually increases from the baffle opening.

15. The apparatus of claim 1, wherein the internal diameter of the baffle gradually decreases from the baffle opening.

16. The apparatus of claim 1, wherein the internal diameter of the baffle is constant along its length.

17. The apparatus of claim 1, wherein:
the fluidisation source has a constant internal diameter; and
the first opening of the baffle has an internal diameter that is the same as the constant internal diameter of the fluidisation source.

18. The apparatus of claim 1, wherein the first opening of the baffle has an internal diameter that is the same as the internal diameter of the fluidisation outlet of the fluidisation source.

19. A method for feeding slurry into a particle separator, comprising:
dividing a chamber into a first zone and a second zone with a baffle having two ends, the second zone being formed inside the baffle and the first zone being formed between the outside of the baffle and the chamber;
feeding the slurry into the first zone;
deflecting the slurry away from the second zone; and
directing fluidisation fluid from a fluidisation source from a fluidisation outlet into an open end of the baffle and through the second zone and through the other open end of the baffle to create a fluidisation flow that combines with the slurry from the first zone in a mixing zone provided between the baffle and a part of the particle separator having inclined channels formed by a series of inclined plates.

20. The method of claim 19, further comprising: (a) feeding the slurry tangentially with respect to a sidewall of the chamber; (b) feeding the slurry so as to induce a rotational flow of the slurry in the first zone; and/or (c) feeding the slurry at opposite sides of a sidewall of the chamber proximate to the opening of the baffle at a point above the intersection between the chamber and the fluidisation source.

21. The method of claim 19, wherein the second zone is surrounded by the first zone.

22. The method of claim 19, further comprising locating the baffle adjacent one end of the chamber to create a gap annular in shape between the baffle and the one end to permit denser and/or larger sized particles to flow along at least one sidewall of the chamber through the gap.

23. The method of claim 19, further comprising forming the chamber with diverging sidewalls to direct the flow of denser and/or larger sized particles in the chamber.

24. The method of claim 19, further comprising:
allowing the slurry to flow downwardly through the plurality of inclined channels such that the low density and/or smaller sized particles escape the fluidisation flow by sliding up the inclined channels while the denser and/or larger sized particles in the slurry slide down the channels; and
removing the low density particles, smaller sized particles, the denser particles or larger sized particles from the particle separator.

25. The method of claim 24, wherein the fluidisation source comprises a fluidisation chamber having a fluidising bed, the method further comprising locating the baffle adjacent to a second end of the chamber to create a gap annular in shape between the baffle, the second end and the fluidisation chamber to permit denser and/or larger sized particles to flow along at least one sidewall of the chamber into the fluidisation chamber.

26. The method of claim 19, wherein the first opening of the baffle has an internal diameter that is the same as the internal diameter of the fluidisation outlet of the fluidisation source.

* * * * *